United States Patent Office 3,352,838
Patented Nov. 14, 1967

3,352,838
METHYLOLATED UREA AND MELAMINE ETHERIFIED WITH BUTANOL AND POLYETHYLENEGLYCOL AS EMULSION POLYMERIZATION AGENTS
Rosemarie Toepfl, Basel, Luzius Schibler, Riehen, and Arthur Maeder, Therwil, Switzerland, assignors to Ciba Limited, Basel, Switzerland, a company of Switzerland
No Drawing. Filed Dec. 4, 1964, Ser. No. 416,145
Claims priority, application Switzerland, Dec. 12, 1963, 15,217/63
2 Claims. (Cl. 260—80.73)

The present invention provides a process for the emulsion polymerization of unsaturated polymerizable compounds, wherein the emulsifying agent used is a water-soluble, curable ether of a methylolmelamine or methylolurea, whose methylol groups are etherified with monohydric alcohols that contain at least 4 carbon atoms and with polyethyleneglycols.

The water-soluble, curable or cross-linkable ethers to be used in the present invention can be prepared by known methods, for example from (a) a formaldehyde condensation product of melamine or urea,
(b) a monohydric alcohol containing at least 4, preferably 4 to 7, carbon atoms, for example n-amyl alcohol [pentanol - (1)], hexanol - (1), 2-ethylbutanol - (1), a benzyl alcohol or especially n-butanol, and
(c) a polyethyleneglycol.

Suitable polyethyleneglycols are, for example, those which have a molecular weight from 600 to 20,000; preferred use is made of those which have a molecular weight within the range from 1000 to 5000.

Suitable water-soluble curable or cross-linkable ethers of methylolmelamines, whose methylol groups are etherified exclusively with n-butanol and with polyethyleneglycols, can be prepared, for example, by converting at first 1 mol of melamine with 3 to 6 mols of formaldehyde in the usual manner into the corresponding polymethylolmelamine, then etherifying at least some of the methylol groups with n-butanol and reacting the resulting etherified product with the polyethyleneglycol by heating at an elevated temperature of about 95° to 100° C. (in a vacuum of, for example, 15 to 20 mm. Hg), preferably in the presence of a small amount of an acid such as acetic acid. A particularly advantageous process for the manufacture of water-soluble mixed ethers of the kind defined above consists substantially in using as a starting material, for example, a polymethylolmelamine butyl ether containing several butyl ether groups and converting some of these butyl ether groups into polyglycol ether groups by heating the butyl ether with the polyethyleneglycol to about 95° to 100° C. under vacuum. This can be illustrated, for example, by the following scheme:

Water-soluble methylolurea mixed ethers can be manufactured in an analogous manner, for example according to the following scheme:

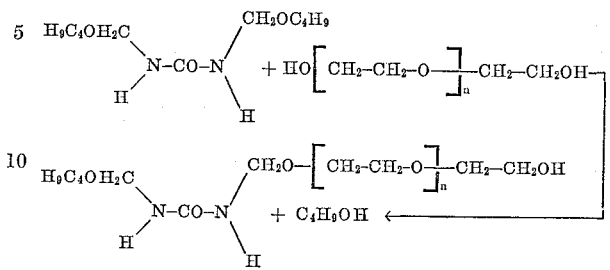

When the emulsifier of the invention is used for the emulsion polymerization of mono- or poly-unsaturated polymerizable compounds, especially ethylene derivatives containing the grouping —CH=C=, there are obtained stable, aqueous polymer emulsions having particularly good technological properties.

The final products may be homopolymers or copolymers, and in the latter case the comonomers used may also be polymerizable compounds which by themselves cannot be polymerized in emulsion. Particularly good results are obtained by using as emulsifier a water-soluble, curable ether of a methylolmelamine whose methylol groups are etherified exclusively with n-butanol and with polyethyleneglycols having a molecular weight ranging from 1000 to 5000.

As monomers suitable for the emulsion polymerization according to this invention there may be mentioned, for example: Vinyl esters of organic acids, for example vinyl acetate, vinyl formate, vinylbutyrate, vinyl trifluoroacetate or vinyl benzoate; furthermore vinylalkyl ketones, vinyl halides such as vinyl chloride, vinyl fluoride, chlorofluoroethylenes or vinylidene chloride; vinylaryl compounds such as styrene and substituted styrenes; furthermore compounds of the acrylic acid series such as esters of acrylic acid with alcohols or phenols, for example ethyl acrylate, n-butyl acrylate, dodecyl acrylate, octadecyl acrylate, phenyl acrylate; esters of acrylic acid with alcohols containing basic nitrogen atoms or their quaternary ammonium compounds; acrylonitrile or acrylic acid amide or its derivatives substituted on the amide nitrogen, such as N-monoalkyl- or N,N-dialkyl-substituted acrylic acid amides, for example N-tertiary butyl acrylamide and N,N-diethyl acrylamide, acrylic acid amides containing tertiary amino nitrogen in the radical bound in amide fashion, for example diethylaminopropyl acrylamide and their quaternation products; N-alkylol-substituted acrylic acid amides, for example N-methylol-acrylic acid amide and the corresponding alkyl ethers, for example N-methoxy-, N-ethoxy- or N-butoxy-methyl acrylic acid amide; also analogous derivatives of methacrylic acid, ethacrylic acid,

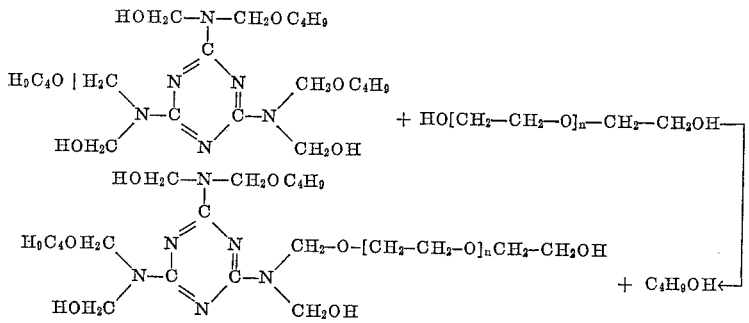

crotonic acid, fumaric acid, maleic or itaconic acid; also acrylic or methacrylic acid itself, if desired in the form of a salt thereof, especially in the form of an alkaline earth metal salt. Furthermore, there may be used polymerizable olefines, such as isobutylene, butadiene, 2-chlorobutadiene or heterocyclic compounds containing at least one vinyl group, such as N-vinyl-pyrrolidone, N-vinylimidazole, vinyl pyridines or vinyl quinolines; furthermore, unsaturated hydrocarbons such as camphen or, finally, unsaturated ethers such as divinyl ether or isobornyl allyl ether.

In general, the emulsion polymerization is performed under the conditions conventionally used in the polymerization technique. Inter alia, it is advantageous to use a polymerization catalyst. As such there are suitable the usual compounds capable of catalyzing polymerizations, such as water-soluble organic or inorganic peroxides or per-salts, for example peracetic acid, hydrogen peroxide, percarbonates, persulphates, especially potassium or ammonium persulfate, or perborates. The amount of catalyst to be added depends on the course the polymerization is desired to take or on the properties the polymer is desired to possess. To facilitate modification of the reaction speed during polymerization and the molecular weight of the polymers it is possible to add so-called regulators, for example a mercaptan or a terpene.

Furthermore, it is advantageous to perform the emulsion polymerization in the absence of air or oxygen and in the presence of an inert gas such as nitrogen. It is also possible to use in addition to the afore-mentioned catalysts and regulators so-called activators. Such activators are, for example, inorganic, oxidizable oxygen-containing sulfur compounds, such as sodium bisulfite, ammonium bisulfite or sodium thiosulfate. As is known, the simultaneous presence of the afore-mentioned activators and the polymerization catalysts which give off oxygen gives rise to the so-called redox systems which have a favourable influence upon the polymerization reaction. Further suitable activators are water-soluble aliphatic tertiary amines such as triethanolamine or diethylethanolamine. In the known manner there may be further added to the aqueous polymerization medium buffers, for example alkali metal phosphates.

In general, it is advantageous to use deionized water for the emulsion polymerization.

The emulsion polymerization can be carried out at room temperature, though it is more advantageous to use an elevated temperature ranging, for example, from 35° to 80° C., and preferably at a pH ranging from about 6 to 8.

The amount of the water-soluble curable mixed ether of the kind defined above to be used as emulsifier in the emulsion polymerization of this invention may vary within relatively wide limits. In general, it is used in an amount of about 10 to 50% by weight, referred to the weight of the monomers to be polymerized in an aqueous emulsion.

With the proposed emulsifiers it is possible to manufacture stable polymer emulsions from which—especially after addition of a curing agent, for example organic or inorganic acids or salts such as para-toluenesulfonic acid, ammonium thiocyanate or ammonium chloride—on heating to, for example 120° to 150° C., films, coatings and impregnations are obtained which are stable towards water and many organic solvents.

The polymer dispersions obtained with the emulsifiers of this invention can be used for producing coatings and impregnations on textile materials, leather, paper or wood, as aqueous colored lakes for metal surfaces, for example as primers for nitrocellulose lacquers for automobiles, for the manufacture of films or foils and advantageously also as binding agents for pigments, for example for pigment prints.

Parts and percentages in the following examples are by weight.

EXAMPLE 1

Homopolymer from vinyl acetate

A pre-emulsion is prepared from 100 parts of vinyl acetate, 50 parts of the Emulsifier A [manifactured as described below] and 208 parts of deionized water. One half of this pre-emulsion is heated to an internal temperature of 62° C. in a reactor, scavenged with nitrogen and equipped with agitator, reflux condenser, thermometer and dropping funnel. 0.2 part of sodium bisulfite in 2 parts of deionized water, and 0.05 part of potassium persulfate in 1.5 parts of deionized water are then added. When the internal temperature has risen by about 4° C., the other half of the pre-emulsion is dropped in within 85 minutes. During this addition four additions of 0.05 part of potassium persulfate in 1.5 parts of deionized water each are made. On completion of the dropwise addition the identical amount of catalyst is added five times more at intervals of 30 minutes, and the batch is further polymerized for 10 hours, to yield a stable, medium viscous emulsion of the homopolymer. The polymer yield amounts to 86.7% of theory. A film produced from this emulsion, cured at 130° C. with addition of a few drops of hydrochloric acid, is insoluble in boiling trichloroethylene.

The Emulsifier A used in the above example can be prepared thus:

1056 parts of aqueous formaldehyde solution (40% by volume) are mixed in a stirring vessel with 32 parts of concentrated aqueous ammonia and heated to 60° C. 226 parts of melamine are added and about 237 parts of an aqueous mixture are distilled off at 80° C. 880 parts of n-butanol are then added and the whole is heated further under vacuum, during which the mixture of butanol and water which passes over separates in the separator and the supernatant butanolic layer returns to the reaction vessel. When 208 parts of water (containing butanol) have separated, a mixture of 6 parts of formic acid and 9 parts of n-butanol is added. Distillation is then continued, and butanol and the water eliminated during the etherification pass over. When about one half to two thirds of the excess n-butanol (that is to say 450 to 600 parts by volume) have passed over, 1000 parts of polyethyleneglycol of molecular weight 4000 (Carbowax 4000) and 5 parts of acetic acid are added. Distillation is then continued at 80° C. until a total of 830 parts of n-butanol has passed over. The reaction vessel is then fitted with a reflux condenser and the batch is heated at 90° to 100° C. under atmospheric pressure until a specimen forms a transparent solution in water (about 1:1). 12.5 parts of triethanolamine are then added, the whole is stirred and cooled, to yield about 1930 parts of a waxy, colorless mass (Emulsifier A).

Instead of Emulsifier A, the Emulsifier B described below may be used for the emulsion polymerization:

*Emulsifier B.*—100 parts of an n-butanolic solution (dry content about 80%) of a hexamethylolmelamine n-butyl ether are heated with 100 parts of polyethyleneglycol (molecular weight 4000) in the presence of 5 parts of glacial acetic acid under a vacuum of 20 mm. Hg at 95° C. to 100° C. until 25 parts of butanol have passed over and the product has become soluble in water. It is then mixed with 6 parts of sodium hydroxide solution of 30% strength and the whole is stirred, then left to itself for some length of time and cooled, whereupon the salt solution is separated. A waxy emulsifier (=Emulsifier B) is obtained which is curable and readily soluble in water.

EXAMPLE 2

Copolymer from n-butyl acrylate/acrylonitrile

A pre-emulsion is prepared from 80 parts of n-butyl acrylate, 20 parts of acrylonitrile, 25 parts of the Emulsifier A described in Example 1 and 172 parts of deionized water. One half of this pre-emulsion is heated to an internal temperature of 56° C. in a reactor which is scavenged with nitrogen and equipped with agitator, reflux condenser, thermometer and dropping funnel. There are then added 0.1 part of sodium bisulfite in 1 part of water, and 0.1 part of ammonium persulfate in 3 parts of water. When the internal temperature has risen by about 2° C., the other half of the pre-emulsion is dropped in within 30 minutes. The mixture thus added contains 0.4 part of ammonium persulfate in 12 parts of deionized water. When the dropwise addition is complete, the bath temperature is raised to 70° C. and the batch is further polymerized at this temperature for 4 hours. A medium viscous emulsion of the copolymer is obtained. The polymer yield amounts to 93% of theory. A film made from this emulsion is insoluble in trichloroethylene after having been cured at 130° C.

EXAMPLE 3

*Copolymer from styrene/n-butyl acrylate*

A pre-emulsion is prepared from 70 parts of styrene, 30 parts of n-butyl acrylate, 50 parts of the Emulsifier A described in Example 1, 0.5 part of triethanolamine and 256 parts of deionized water. One half of this pre-emulsion is heated to an internal temperature of 55° C. in a reactor scavenged with nitrogen and equipped with agitator, reflux condenser, thermometer and dropping funnel. There are then added 0.2 part of sodium bisulfite in 2 parts of deionized water, and 0.05 part of potassium persulfate in 1.5 parts of deionized water. When the internal temperature has risen by about 5° C., the other half of the pre-emulsion is dropped in within 40 minutes. During the dropwise addition two additions each of 0.05 part of potassium persulfate in 1.5 parts of deionized water are made. On completion of the dropwise addition the addition of catalyst is repeated seven times more at intervals of 30 minutes each. The bath temperature is then raised to 70° C. and the batch is further polymerized at this temperature for 6 hours. A stable, thinly liquid emulsion of the copolymer is obtained. The polymer yield amounts to 93.5% of theory. A film made from this emulsion is insoluble in trichloroethylene after having been cured at 130° C. with addition of a few drops of hydrochloric acid.

EXAMPLE 4

*Copolymer from ethyl acrylate/acrylonitrile*

A pre-emulsion is prepared from 70 parts of ethyl acrylate, 30 parts of acrylonitrile, 50 parts of the Emulsifier A described in Example 1, 0.5 part of triethanolamine and 256 parts of deionized water.

One half of this pre-emulsion is heated to an internal temperature of 53° C. in a reactor scavenged with nitrogen and equipped with agitator, reflux condenser, thermometer and dropping funnel. There are then added 0.2 part of sodium bisulfite in 2 parts of water, and 0.05 part of potassium persulfate in 1.5 parts of water. When the internal temperature has risen by about 6° C., the other half of the pre-emulsion is dropped in within 30 minutes. During this dropwise addition another addition of 0.05 part of potassium persulfate in 1.5 parts of water is made. When the dropwise addition is terminated, the addition of catalyst is repeated eight times more at intervals of 30 minutes each. The batch temperature is then raised to 70° C. and the batch is further polymerized at this temperature for 6 hours. A stable, medium viscous emulsion of the copolymer is obtained. The polymer yield amounts to 92.8% of theory. A film made from this emulsion is insoluble in boiling trichloroethylene after having been cured at 130° C. with addition of a few drops of hydrochloric acid.

EXAMPLE 5

*Copolymer from n-butyl acrylate/acrylonitrile/calcium acrylate*

A pre-emulsion is prepared from 68 parts of n-butyl acrylate, 30 parts of acrylonitrile, 2 parts of calcium acrylate, 25 parts of the Emulsifier A described in Example 1 and 150 parts of deionized water. One half of this pre-emulsion is heated to an internal temperature of 50° C. in a reactor scavenged with nitrogen and equipped with agitator, reflux condenser, thermometer and dropping funnel. There are then added 0.1 part of sodium bisulfite in 1 part of deionized water, and 0.1 part of ammonium persulfate in 3 parts of water. When the internal temperature has risen by about 6° C., the other half of the pre-emulsion is dropped in within 30 minutes. On completion of the dropwise addition the internal temperature is 68° C. The remainder of the catalyst solution is mixed over 4 hours portionwise with 0.05 part of ammonium persulfate in 1.5 parts of deionized water. A thinly liquid copolymer emulsion is obtained. The polymer yield amounts to 94.0% of theory. A film made from this emulsion and cured at 130° C. is insoluble in trichloroethylene.

EXAMPLE 6

*Copolymer from n-butyl acrylate/methylolacrylamide methyl ether/calcium acrylate*

A pre-emulsion is prepared from 93 parts of n-butyl acrylate, 5 parts of methylolacrylamide methyl ether, 2 parts of calcium acrylate, 25 parts of the Emulsifier A described in Example 1 and 170 parts of deionized water. One half of this pre-emulsion is heated to an internal temperature of 61° C. in a reactor scavenged with nitrogen and equipped with agitator, reflux condenser, thermometer and dropping funnel. There are then added 0.2 part of sodium bisulfite in 2 parts of deionized water, and 0.05 part of potassium persulfate in 1.5 parts of deionized water. When the internal temperature has risen by about 9° C., the other half of the pre-emulsion is dropped in within 55 minutes. During this dropwise addition, there are made three additions each of 0.05 part of potassium persulfate in 1.5 parts of deionized water. When the dropwise addition is terminated, the addition of catalyst is repeated six times more after intervals of 30 minutes each, and the batch is further polymerized for 10 hours. The polymer yield amounts to 99.0% of theory. A film made from this emulsion and cured at 130° C. with adition of a few drops of hydrochloric acid is insoluble in boiling trichloroethylene.

EXAMPLE 7

*Copolymer from n-butyl acrylate/methylolacrylamide/ calcium acrylate*

A pre-emulsion is prepared from 92 parts of n-butyl acrylate, 5 parts of methylolacrylamide, 3 parts of calcium acrylate, 25 parts of the Emulsifier A described in Example 1 and 176 parts of deionized water. One half of this pre-emulsion is heated to an internal temperature of 62° C. in a reactor scavenged with nitrogen and equipped with agitator, reflux condenser, thermometer and dropping funnel. There are then added 0.2 part of sodium bisulfite in 2 parts of deionized water, and 0.05 part of potassium persulfate in 1.5 parts of deionized water. When the internal temperature has risen by about 8° C., the other half of the pre-emulsion is dropped in within 30 minutes. On completion of the dropwise addition, the addition of catalyst is repeated nine times more at intervals of 30 minutes each and the batch is then further polymerized for 3 hours. The polymer yield amounts to 98.2% of theory. A film made from this emulsion and cured at 130° C. with addition of a few drops of hydrochloric acid is insoluble in boiling trichloroethylene.

EXAMPLE 8

*Copolymer from vinyl acetate/diethylaminopropyl acrylamide quaternated with chloroacetamide*

A pre-emulsion is prepared from 95 parts of vinyl acetate, 5 parts of diethylaminopropyl acrylamide quaternated with chloroacetamide, 50 parts of the Emulsifier A described in Example 1 and 202 parts of deionized water.

One half of this pre-emulsion is heated to an internal temperature of 61° C. in a reactor scavenged with nitrogen and equipped with agitator, dropping funnel and thermometer. There are then added 0.2 part of sodium bisulfite in 2 parts of water, and a solution of 0.1 part of potassium persulfate in 3 parts of water. When the internal temperature has risen by about 4° C., the other half of the pre-emulsion is dropped in within 30 minutes. During this dropwise addition two additions are made each of 0.05 part of potassium persulfate in 1.5 parts of water. On completion of the dropwise addition, the addition of catalyst is repeated six more times at intervals of 30 minutes each, and the batch is then further polymerized for 6 hours. The polymer yield amounts to 87.2% of theory.

EXAMPLE 9

*Copolymer from vinyl acetate/calcium acrylate*

A pre-emulsion is prepared from 98 parts of vinyl acetate, 2 parts of calcium acrylate, 50 parts of the Emulsifier A described in Example 1 and 209 parts of deionized water. One half of this pre-emulsion is heated to an internal temperature of 62° C. in a reactor scavenged with nitrogen and equipped with agitator, dropping funnel and thermometer. There are then added 0.2 part of sodium bisulfite in 2 parts of deionized water, and 0.05 part of potassium persulfate in 1.5 parts of deionized water. When the internal temperature has risen by about 3° C., the other half of the pre-emulsion is dropped in within 60 minutes. During the dropwise addition, four additions are made each of 0.05 part of potassium persulfate in 1.5 parts of deionized water. After all has been dropped in, the catalyst addition is repeated five more times at intervals of 30 minutes each and the batch is further polymerized for another 10 hours. The polymer yield amounts to 84.6% of theory. A film made from this emulsion and cured at 130° C. with addition of a few drops of hydrochloric acid is insoluble in boiling trichloroethylene.

EXAMPLE 10

*Copolymer from n-butyl acrylate/acrylonitrile/calcium acrylate*

A pre-emulsion is prepared from 68 parts of n-butyl acrylate, 30 parts of acrylonitrile, 2 parts of calcium acrylate, 50 parts of the Emulsifier C manufactured as described below, 2 parts of triethanolamine and 112 parts of deionized water. One half of this pre-emulsion is heated to an internal temperature of 40° C. in a reactor scavenged with nitrogen and equipped with agitator, reflux condenser, thermometer and dropping funnel. There are then added 0.1 part of sodium bisulfite in 1 part of deionized water, and 0.05 part of ammonium persulfate in 1.5 parts of deionized water. When the internal temperature has risen by 5.5° C., the other half of the pre-emulsion is mixed with a solution of 0.3 part of ammonium persulfate in 9 parts of water and dropped in within 30 minutes. On completion of the dropwise addition, a solution of 0.05 part of ammonium persulfate in 1.5 parts of water is added and this addition is repeated twice more after intervals of 30 minutes each. The batch is then further polymerized for 3 hours, to yield a thinly liquid, pure emulsion. The polymer yield is 93.8% of theory.

In 88 parts of the resulting polymer latex (having a dry content of about 50%) there are dispersed with the aid of a color mill for wet grinding 12 parts of titanium white. 100 parts of the resulting pigment suspension, which is as such stable, are mixed with 1 part of formic acid of 85% strength and 1 part of a 50% solution of ammonium nitrate. When this mixture is brushed or sprayed over sheet iron or glass and then dried and finally "stoved" for 20 minutes at 120° C., a tough and water-resistant film is obtained.

The Emulsifier C, used in the above example, can be prepared thus:

100 parts of a urea-formaldehyde resin etherified with butanol (Lacquer Resin H53) are mixed with 100 parts of polyglycol ether of molecular weight 1540 under vacuum at 80° C. until 15 parts of butanol have passed over and the reaction product forms a clear 1:1-solution in water. The aqueous solution—which gradually turns turbid—is adjusted with triethanolamine to a pH value of 7.9. The product displays strong surface-active properties which enable it to be used as an emulsifier and dispersant.

EXAMPLE 11

*Copolymer from n-butyl acrylate/acrylonitrile/calcium acrylate*

A pre-emulsion is prepared from 68 parts of n-butyl acrylate, 30 parts of acrylonitrile, 2 parts of calcium acrylate, 50 parts of the Emulsifier D manufactured as described below, 2 parts of triethanolamine and 112 parts of deionized water. One half of this pre-emulsion is heated to an internal temperature of 40° C. in a reactor scavenged with nitrogen and equipped with agitator, reflux condenser, thermometer and dropping funnel. There are then added a solution of 0.1 part of sodium bisulfite in 1 part of deionized water, and a solution of 0.05 part of ammonium persulfate in 1.5 parts of deionized water. When the internal temperature has risen by 5° C., the other half of the pre-emulsion is mixed with a solution of 0.3 part of ammonium persulfate in 9 parts of water and dropped in within 30 minutes. On completion of the dropwise addition, a solution of 0.05 part of ammonium persulfate in 1.5 parts of water is added, and this addition is repeated twice more at intervals of 30 minutes each. The batch is then further polymerized for 3 hours, to yield a thinly liquid, pure emulsion. The polymer yield amounts to 91.2% of theory.

95 parts of the resulting polymer latex are mixed with 5 parts of a 25% solution of primary ammonium phosphate ($NH_4H_2PO_4$). The binding agent is stable for some length of time and is used for glueing plywood. After drying, if desired or required at an elevated temperature, the bonded plywood is resistant towards water.

The Emulsified D used for the above polymerization is obtained thus:

100 parts of a condensation product from urea and formaldehyde, etherified with butanol, are mixed with 12 parts of lauryl alcohol and the mixture is heated under vacuum until 16 parts of butanol have passed over. 100 parts of polyglycol ether of molecular weight 1540 are then added and the whole is refluxed at 95° C. to 100° C. until the reaction product gives a clear 1:1-solution in water. The aqueous 50% solution (=Emulsifier D) is adjusted to pH=8.0. It turns gradually slightly turbid but retains nevertheless its excellent emulsifying and lathering properties. When it is heated in the presence of an acid or acid donor, irreversible gelation occurs, whereas in a dilute solution flocculation is observed.

EXAMPLE 12

*Copolymer from n-butyl acrylate/acrylonitrile/calcium acrylate*

A pre-emulsion is prepared from 68 parts of n-butyl acrylate, 30 parts of acrylonitrile, 2 parts of calcium acrylate, 50 parts of the Emulsifier C desribed in Example 10, 2 parts of triethanolamine and 112 parts of deionized water. One half of this pre-emulsion is heated to an internal temperature of 40° C. in a reactor scavenged with nitrogen and equipped with agitator, reflux condenser, thermometer and dropping funnel. There are then added 0.1 part of sodium bisulfite in 1 part of deionized water, and 0.05 part of ammonium persulfate in 1.5 parts of deionized water. When the internal temperature has risen by 5.5° C., the other half of the pre-emulsion is mixed with a solution of 0.3 part of ammonium persulfate in 9 parts and dropped in within 30 minutes. On completion of the dropwise addition a solution of 0.05 part of ammonium persulfate in 1.5 parts of water is added and this addition is repeated twice more at intervals of 30 minutes each.

The batch is then further polymerized for 3 hours, to yield a thinly liquid, pure emulsion. The polymer yield amounts to 93.8% of theory.

EXAMPLE 13

*Copolymer from n-butyl acrylate/acrylonitrile/calcium acrylate*

A pre-emulsion is prepared from 68 parts of n-butyl acrylate, 30 parts of acrylonitrile, 2 parts of calcium acrylate, 50 parts of the Emulsified D described in Example 11, 2 parts of triethanolamine and 112 parts of deionized water. One half of this pre-emulsion is heated to an internal temperature of 40° C. in a reactor scavenged with nitrogen and equipped with agitator, reflux condenser, thermometer and dropping funnel. There are then added a solution of 0.1 part of sodium bisulfite in 1 part of deionized water and a solution of 0.05 part of ammonium persulfate in 1.5 parts of deionized water. When the internal temperature has risen by 5° C., the other half of the pre-emulsion is mixed with a solution of 0.3 part of ammonium persulfate in 9 parts of water and dropped in within 30 minutes. On completion of the dropwise addition, a solution of 0.05 part of ammonium persulfate in 1.5 parts of water is added and this addition is repeated twice more at intervals of 30 minutes each. The batch is then further polymerized for 3 hours, to yield a thinly liquid, pure emulsion. The polymer yield amounts to 91.2% of theory.

What is claimed is:

1. A process for the emulsion polymerization of unsaturated polymerizable compounds, wherein the emulsifier used is a water-soluble curable ether of a member selected from the group consisting of (1) a methylolmelamine, whose methylol groups are etherified with a monohydric alcohol containing at least 4 carbon atoms and further with a polyethyleneglycol and (2) a methylolurea whose methylol groups are etherified with a monohydric alcohol containing at least 4 carbon atoms and further a polyethyleneglycol.

2. A process as claimed in claim 1, wherein water-soluble curable ethers of methylolmelamines are used, whose methylol groups are etherified exclusively with n-butanol and polyethyleneglycols having a molecular weight from 1000 to 5000.

No references cited.

JOSEPH L. SCHOFER, *Primary Examiner.*

S. M. LEVIN, *Assistant Examiner.*